(12) United States Patent
Herdy

(10) Patent No.: US 9,215,395 B2
(45) Date of Patent: Dec. 15, 2015

(54) APPARATUS, SYSTEM, AND METHOD FOR PROVIDING SOCIAL CONTENT

(71) Applicant: Ronaldo Luiz Lisboa Herdy, Orlando, FL (US)

(72) Inventor: Ronaldo Luiz Lisboa Herdy, Orlando, FL (US)

( * ) Notice: Subject to any disclaimer, the term of this patent is extended or adjusted under 35 U.S.C. 154(b) by 358 days.

(21) Appl. No.: 13/801,776

(22) Filed: Mar. 13, 2013

(65) Prior Publication Data

US 2013/0242064 A1    Sep. 19, 2013

Related U.S. Application Data

(60) Provisional application No. 61/611,410, filed on Mar. 15, 2012.

(51) Int. Cl.
| | |
|---|---|
| H04N 5/44 | (2011.01) |
| H04N 5/445 | (2011.01) |
| H04N 7/14 | (2006.01) |
| H04N 7/15 | (2006.01) |
| H04N 21/422 | (2011.01) |
| H04N 21/4223 | (2011.01) |
| H04N 21/44 | (2011.01) |
| H04N 21/442 | (2011.01) |
| H04N 21/4788 | (2011.01) |

(52) U.S. Cl.
CPC ......... *H04N 5/4403* (2013.01); *H04N 5/44591* (2013.01); *H04N 7/147* (2013.01); *H04N 7/15* (2013.01); *H04N 21/4223* (2013.01); *H04N 21/42203* (2013.01); *H04N 21/44008* (2013.01); *H04N 21/44218* (2013.01); *H04N 21/4788* (2013.01)

(58) Field of Classification Search
CPC ... H04N 5/4403; H04N 5/44591; H04N 5/45; H04N 7/14; H04N 7/147; H04N 7/15; H04N 7/157; H04N 21/4788; H04N 21/4361
USPC ............... 348/51; 709/204, 205, 206, 207
See application file for complete search history.

(56) References Cited

U.S. PATENT DOCUMENTS

| | | | |
|---|---|---|---|
| 6,744,460 B1 | 6/2004 | Nimri et al. | |
| 6,909,451 B1 * | 6/2005 | Latypov et al. ............ | 348/14.07 |
| 7,018,053 B2 | 3/2006 | Dwyer et al. | |
| 7,046,269 B2 | 5/2006 | Parker et al. | |
| 7,797,383 B2 | 9/2010 | Baird | |
| 7,886,003 B2 | 2/2011 | Newnam et al. | |
| 8,044,990 B2 | 10/2011 | Kawaguchi | |

(Continued)

OTHER PUBLICATIONS

PCT/US2013/031009 International Search Report and Written Opinion, Jun. 20, 2013.

*Primary Examiner* — Jay Patel
*Assistant Examiner* — Francis G Geroleo
(74) *Attorney, Agent, or Firm* — Kunzler Law Group

(57) ABSTRACT

An apparatus, system, and method are disclosed for providing social content and/or interaction. A content tracking module is configured to track content displayed at multiple locations on an electronic display. An individual tracking module is configured to track one or more individuals in multiple video feeds of observing areas at the multiple locations. The multiple video feeds include a first video feed and a second video feed. A change detection module is configured to detect a change in expression and/or a body movement in at least one individual in the first video feed and an overlay display module is configured to initiate display of an image of the at least one individuals overlaying the content displayed at a location of the second video feed.

20 Claims, 7 Drawing Sheets

(56) References Cited

U.S. PATENT DOCUMENTS

| | | |
|---|---|---|
| 8,081,205 B2 | 12/2011 | Baird et al. |
| 8,161,504 B2 | 4/2012 | Newell |
| 8,327,395 B2 * | 12/2012 | Lee et al. .................. 725/10 |
| 2006/0184624 A1 | 8/2006 | Thukral |
| 2006/0200518 A1 | 9/2006 | Sinclair et al. |
| 2006/0248210 A1 | 11/2006 | Kenoyer |
| 2007/0271586 A1 * | 11/2007 | Alperin .................. 725/109 |
| 2008/0168154 A1 | 7/2008 | Skyrm et al. |
| 2008/0298571 A1 | 12/2008 | Kurtz et al. |
| 2009/0249222 A1 | 10/2009 | Schmidt et al. |
| 2009/0249225 A1 | 10/2009 | Beswick et al. |
| 2009/0287790 A1 | 11/2009 | Upton et al. |
| 2010/0037151 A1 | 2/2010 | Ackerman et al. |
| 2010/0242074 A1 | 9/2010 | Rouse et al. |
| 2011/0063440 A1 | 3/2011 | Neustaedter et al. |
| 2011/0093273 A1 | 4/2011 | Lee et al. |
| 2012/0185887 A1 | 7/2012 | Newell |
| 2012/0215849 A1 * | 8/2012 | Shekhawat et al. .......... 709/204 |
| 2012/0311032 A1 * | 12/2012 | Murphy et al. ............... 709/204 |
| 2013/0215027 A1 * | 8/2013 | Van Lydegraf et al. ....... 345/158 |

\* cited by examiner

APPARATUS, SYSTEM, AND METHOD FOR PROVIDING SOCIAL CONTENT

BACKGROUND

1. Field

This invention relates to remote communication and more particularly relates to providing social content for remote communication.

2. Description of the Related Art

Spending in-person time with friends or family is often done while engaging in activities together. Such activities often include watching television, movies, or other content or playing games, such as video games, together. One of the enjoyable things about doing activities together is observing other's reactions or sharing experiences. For example, while watching a movie, a grandparent may glance at grandchildren seated nearby to observe their laughs, excitement, or other reactions.

However, when friends or family are not near, or cannot be conveniently visited, such activities are difficult to do together. Rather, friends and family that are located remotely from each other may talk by phone, send text or email messages, or may communicate via video phone calls or conferencing. While of great utility for communication, however, none of these methods of communication provide the experience of being spending time together in-person or engaging in activities together.

BRIEF SUMMARY

From the foregoing discussion, it should be apparent that a need exists for an apparatus, system, and method that provide social content and/or interaction. Beneficially, such an apparatus, system, and method would allow people, such as friends and families, to engage in activities together, such as watching movies, while not being at the same physical location. As used herein, different physical locations can refer to different rooms in a same building or different locations across the globe.

The present invention has been developed in response to the present state of the art, and in particular, in response to the problems and needs in the art that have not yet been fully solved by currently available social content systems. Accordingly, the present invention has been developed to provide an apparatus, system, and method for providing social content that overcome many or all of the above-discussed shortcomings in the art.

The apparatus to provide social content is provided with a plurality of modules configured to functionally execute the necessary steps of providing social content. These modules in the described embodiments include a content tracking module configured to track content displayed at multiple locations. In one embodiment, the content is displayed on an electronic display. In another embodiment, an individual tracking module is configured to track one or more individuals in multiple video feeds of observing areas at the multiple locations. In some embodiments, the multiple video feeds include a first video feed and a second video feed.

The apparatus further includes, in one embodiment, a change detection module configured to detect a change in expression and/or a body movement in at least one individual in the first video feed. The change detection module, in further embodiments, includes a motion detection module configured to detect motion of an individual. The motion, in some embodiments, is detected by evaluating at least a portion of a video feed and is assigned a movement level. Also included is an expression detection module configured to detect an expression of an individual by evaluating at least a portion of a video feed corresponding to a face of an individual. In some embodiments, an emotional state is assigned to the individual in response to the expression being detected. Finally, in yet another embodiment, a gesture detection module is included that is configured to detect gestures performed by an individual. The gestures, in certain embodiments, are detected by evaluating at least a portion of a video feed. In one embodiment, one or more interactive features may be controlled in response to one or more gestures being detected.

The apparatus, in another embodiment, includes an overlay display module that is configured to initiate display of an image of the at least one individuals overlaying the content displayed at a location of the second video feed. The overlay display module, in certain embodiments, displays an image of the at least one individuals in three dimensions ("3D"), the 3D image being displayed on an external surface. An overlay control module, in one embodiment, is configured to adjust the display of one or more individuals on the electronic display in response to a user adjusting one or more display settings associated with a displayed image of an individual. In certain embodiments, a contact tracking module is configured to track the status of one or more contacts associated with a user. In some embodiments, a list of available contacts is displayed on the electronic display such that a user may select one or more available contacts to interact with from the list of available contacts.

The apparatus is further configured to include, in one embodiment, an individual identification module configured to identify one or more individuals within a video feed using one or more identification techniques. In another embodiment, one or more overlays associated with the one or more individuals are displayed on the electronic display. In yet another embodiment, a menu module is configured to present a list of available content and/or available contacts where the available content is associated with one or more available contacts that are currently viewing the associated available content. In certain embodiments, the user may select either an available content or an available contact.

An invitation module, in one embodiment, is configured to invite one or more contacts associated with a user to view content with the user. An invite, in some embodiments, may be sent to one or more contacts using an electronic message system and/or a social network platform. In another embodiment, the apparatus includes a contact import module that is configured to import one or more contacts associated with a user. In other embodiments, the one or more contacts are imported an email account and/or a social network account associated with the user. In yet another embodiment a security module is configured to limit access to one or more data and video feeds by assigning access permissions to the one or more data and video feeds such that a user is granted access in response to having an associated account with the correct permissions. The apparatus further includes, in certain embodiments, an advertising module configured to detect one or more actions of individuals in response to being presented with an advertisement.

A system of the present invention is also presented to provide social content. In particular, the system, in one embodiment, includes a content provider, a social network provider, and a social content apparatus, which communicate over a network. The social content apparatus, in one embodiment, includes a content tracking module that tracks content displayed at multiple locations. In one embodiment, the content is displayed on an electronic display. In another embodiment, an individual tracking module is configured to track one or more individuals in multiple video feeds of observing areas at the multiple locations. In some embodiments, the multiple video feeds include a first video feed and a second video feed.

The apparatus further includes, in one embodiment, a change detection module configured to detect a change in expression and/or a body movement in at least one individual in the first video feed. The apparatus, in another embodiment, includes an overlay display module that is configured to initiate display of an image of the at least one individuals overlaying the content displayed at a location of the second video feed. Moreover, the system, in yet another embodiment, includes a video capture module configured to capture a video feed of an observing area of the electronic display. In one embodiment, the video feed includes visual and audio information. In another embodiment, the video capture module is located in a body of a display device.

The system, in one embodiment, further includes a video encoding module configured to encode a video feed generated by a video capture module. In other embodiments, the video feed is encoded in a compressed format. In another embodiment, the system includes a projector that is configured to project images onto an external surface, the projector being rotatable and/or tiltable.

A method of the present invention is also presented for providing social content. The method in the disclosed embodiments substantially includes the steps necessary to carry out the functions presented above with respect to the operation of the described apparatus and system. In one embodiment, the method includes tracking content displayed at multiple locations on an electronic display. In another embodiment, the method includes tracking one or more individuals in multiple video feeds of observing areas at the multiple locations. In certain embodiments, the video feeds include a first video feed and a second video feed.

In other embodiments, the method includes detecting a change in expression and/or body movement in at least one of the one or more individuals in the first video feed and initiating display of an image of the at least one individuals overlaying the content displayed at a location of the second video feed. The method, in one embodiment, further includes adjusting the display of one or more individuals on the electronic display in response to a user adjusting one or more display settings associated with a displayed image of an individual. In another embodiment, the method includes tracking the status of one or more contacts associated with a user. In yet another embodiment, a list of available contacts is displayed on the electronic display such that a user may select one or more available contacts to interact with from the list of available contacts.

The method may further include in certain embodiments identifying one or more individuals within a video feed using one or more identification techniques. In a further embodiment, one or more overlays associated with the one or more individuals are displayed on the electronic display. In another embodiment, the method includes presenting a list of one or more of available content and available contacts where the available content is associated with one or more available contacts that are currently viewing the associated available content. In one embodiment, the user selects either an available content or an available contact.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1A:
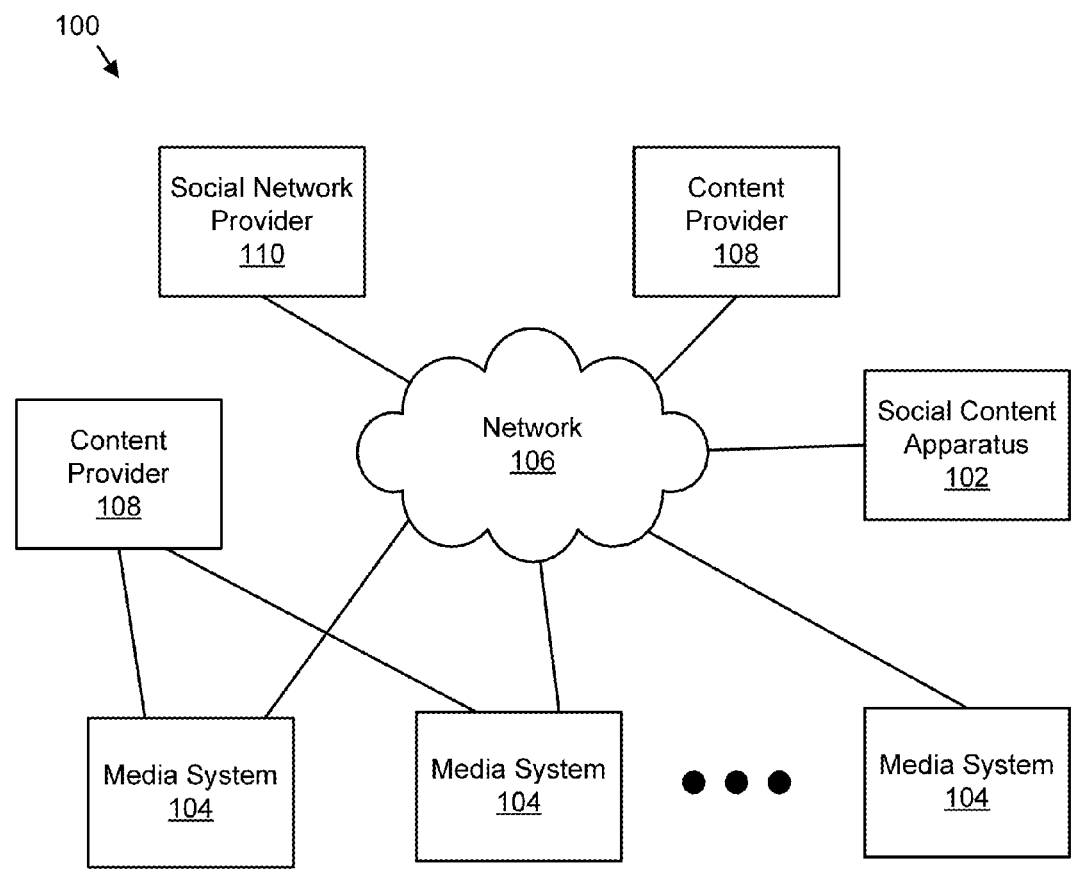
FIG. 1A is a schematic diagram illustrating one embodiment of a social content system in accordance with the present invention.

Many forms of remote communication distract from any activity, including those that might normally be performed together. For example, it is difficult to carry on an audio phone, video phone, or even texting conversation while watching or participating or watching in media content. For example, if texting is performed while watching a movie attention is drawn away from the movie for the period during which a text message is drafted and sent. Thus, a portion of the movie is missed. Alternatively, the movie may draw an individual's attention away from a phone or video conversation and may thus make it unenjoyable or distracting to carry on a remote conversation with someone who is watching TV or playing a video game. Once the presentation of content is over, the thoughts, ideas, or other aspects may be forgotten and may be difficult or even impossible to properly to communicate.

Available forms of remote communication can also feel unnatural in comparison to in-person communications. For example, if grandparents want to see their remotely located grandchildren they might start a video conference or video phone call. However, it can be extremely unnatural to interact with their grandchildren this way. Sitting and staring at each other with no environmental commonalties can seem disjointed and even awkward. Children, and even adults, often quickly bore of such communication and want to return to other activities. Similarly, grandparents may desire to watch the children as they simply go about their activities and not necessarily see them in the unnatural environment provided by video or conference calls.

Furthermore, remote forms of communication do not provide the interaction that friends enjoy when they are together. For example, friends who enjoy watching television or playing video games together often enjoy the camaraderie of each other's presence, sharing conversation, and even facial expression of each other in response to observed content. Other social interactions, such as texting or a video conference, require attention to be pulled away from the game or television in order to be used, making it difficult to get the feel of playing games together when they are not in the same room. Furthermore, content may be missed so calling or communicating during the presentation of content or playing of a game is discouraged.

The present disclosure discusses apparatuses, systems, and methods which can provide more natural and enjoyable remote interaction with others and/or allow individuals to take part in consuming content together. In one embodiment, images of friends or other contacts are shown overlaying a portion of content displayed on a screen. In another embodiment, emotions, movements, or gestures may be sensed and may trigger display of images of friends, family, or contacts located at a remote location. This may provide a more natural environment for enjoying a movie or other content together while not distracting from the content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1A is a schematic diagram illustrating one embodiment of a social content system 100. The social content system 100 may help provide images of family, friends, or other individuals at remote locations to an individual. The social content system 100 includes a social content apparatus 102, a plurality of media systems 104, a network 106, one or more content providers 108, and a social network provider 110. The social content system 100 and components 102-110 are exemplary only and may not all be present in all embodiments.

The media systems 104 are configured to display media content to one or more individuals. The media systems 104 may include apparatuses, systems, and devices for displaying visual content and may also provide other types of content, such as audio content. The media systems 104 may be used to play or display content from the social content apparatus 102, a content provider 108, the social network provider 110, or any other source. In one embodiment, the media systems 104 are end-user entertainment systems located at a home, workplace, or other location. For example, two or more of the media systems 104 may be located at the houses of friends.

The social content apparatus 102 may be configured to generate an overlay that includes images of an individual at the location of one media system 104 for display on another media system 104. For example, if a first individual at one media system has a change in emotion the social content apparatus 102 may create an overlay showing the first individual on another media system 104.

In the depicted embodiment the social content apparatus 102 is in communication with the media systems 104, content providers 108, and/or social network provider 110 over a network 106. In one embodiment, the network 106 may be the internet, a network of a content providers, or any other type of data or communications network. The network 106 may include one or more subnetworks, including one or more of a local area network (LAN), a wide area network (WAN), the internet, and/or any other network.

The content providers 108 may provide any type of visual content for display on the media systems 104. For example, the content providers may provide TV shows, movies, games, or any other type of content for display on the media systems 104. Some content providers 108 may be connected to the media systems 104 over the network 106. For example, some content providers 108 may provide content to the media systems 104 over the internet. Exemplary internet content providers may include video streaming sites that provide television content, games, movies, or user generated content such as Hulu.com®, Netflix®, YouTube®, and the like. In one embodiment, content providers 108 may provide content directly to the media system 104, such as over a content provider 108 network. For example, a cable company or a satellite dish company may distribute content over a cable or satellite network.

The social network provider 110 may include any type of social network known in the art. In one embodiment, a social network may be formed by users of the media systems 104 and/or the social content apparatus 102. The social network provider 100 may include social networks where individuals may create connections with each other. These connections often indicate a relationship between the individuals. Individuals that are connected through these connections are often referred to as contacts or friends on the social network. Exemplary social network providers 110 currently available include Facebook®, LinkedIn®, Google Plus®, and the like. In one embodiment, the social content system 100 may leverage an existing social network and/or may form a social network for sharing of content between users of the media systems 104. For example, some users of media systems 104 and/or a social content apparatus 102 may not have accounts with a separate social network provider 110 and may instead become part of a social network formed by users of the media systems 104 and/or a social content apparatus 102. For example, a user may be able to create an account for content sharing with others to utilize a social content system 100. The resulting social network may include any of the functionality available with other social networks and/or may include additional functionality as discussed herein.

In the depicted embodiment, the social content apparatus 102 is located remotely from the media systems 104. This may allow for centralized processing of connections, video, or other data for a plurality of different media systems 104 and may reduce the amount of processing required at the location of the media systems 104. In one embodiment, this may reduces costs for end user and/or allow more efficient and quicker processing of data.

Figure 1B:
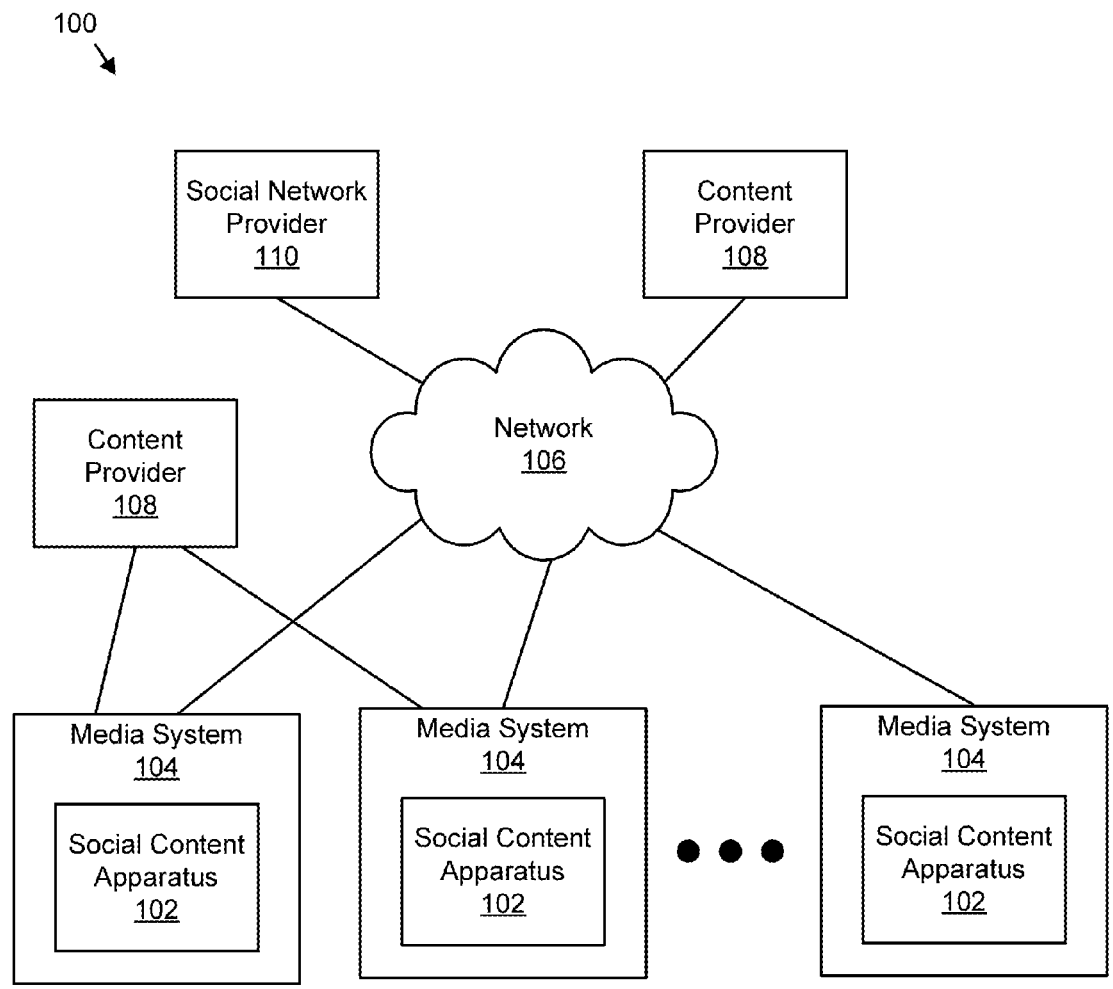
FIG. 1B is a schematic block diagram illustrating another embodiment of a social content system in accordance with the present invention.

FIG. 1B is a schematic diagram illustrating another embodiment of a social content system 100. Similar to the embodiment of FIG. 1A the social content system 100 includes a plurality of media systems 104, a network 106, one or more content providers 108, and a social network provider 110. However, in the embodiment of FIG. 1B, each of the media systems include a social content apparatus 102. Other embodiments may include some media systems 104 with a social content apparatus 102 while other media systems utilize a remote social content apparatus 102 that is accessible over a network 106.

Figure 2:
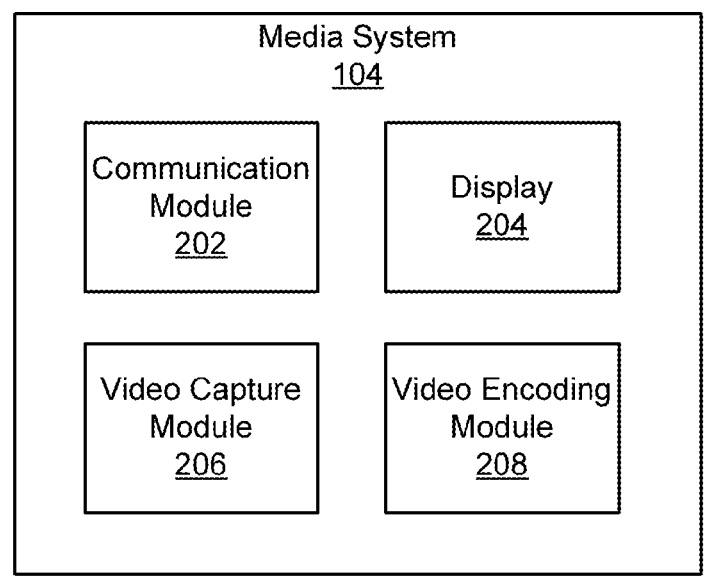
FIG. 2 is a schematic block diagram illustrating one embodiment of a media system in accordance with the present invention.

FIG. 2 is a schematic block diagram illustrating one embodiment of a media system 104. The media system 104 includes a communication module 202, a display 204, a video capture module 206, and a video encoding module 210.

The communication module 202 may be configured to allow the media system 104 to communicate with one or more other devices and systems. The communication module 202 may receive data from other components of a social content system 100 such as from the content providers 108 and/or a social content apparatus 102. In one embodiment, the communication module 202 may include a network interface card, modem, satellite dish, set-top box, or any other device or system for receiving a signal from another device or system. Similarly, the communication module 202 may send data to one or more other devices.

The display 204 may display visual information for observing by one or more individuals. In one embodiment, the display 204 may include a television screen, a monitor, a projector, or any other type of display known in the art. According to one embodiment, the display 204 displays content received by the media system 104 through the communication module 202. In one embodiment, the display 204 may also be used to play or display local content such as content on a memory device such as a compact disc (CD), digital video disc (DVD), a hard disc drive (HDD), flash memory, or other memory. In one embodiment, the content played on the display 204 is reported to another application, device or system. For example, the current content may be communicated to another device or system via the communication module 202.

The display 204 or media system 104 may also include one or more speakers for playing audio content. For example, audio from a movie, television show, or other content may be played over the speakers. In one embodiment, a media system 104 having more than one speaker may dedicate certain speakers to certain content. For example, one or more speakers may be dedicate to audio playback corresponding to media content while one or more different speakers may be dedicated to audio playback of audio captured by other media systems. In one embodiment, audio from other media systems may only be played at selected times, as will be further illustrated below.

Figure 3:
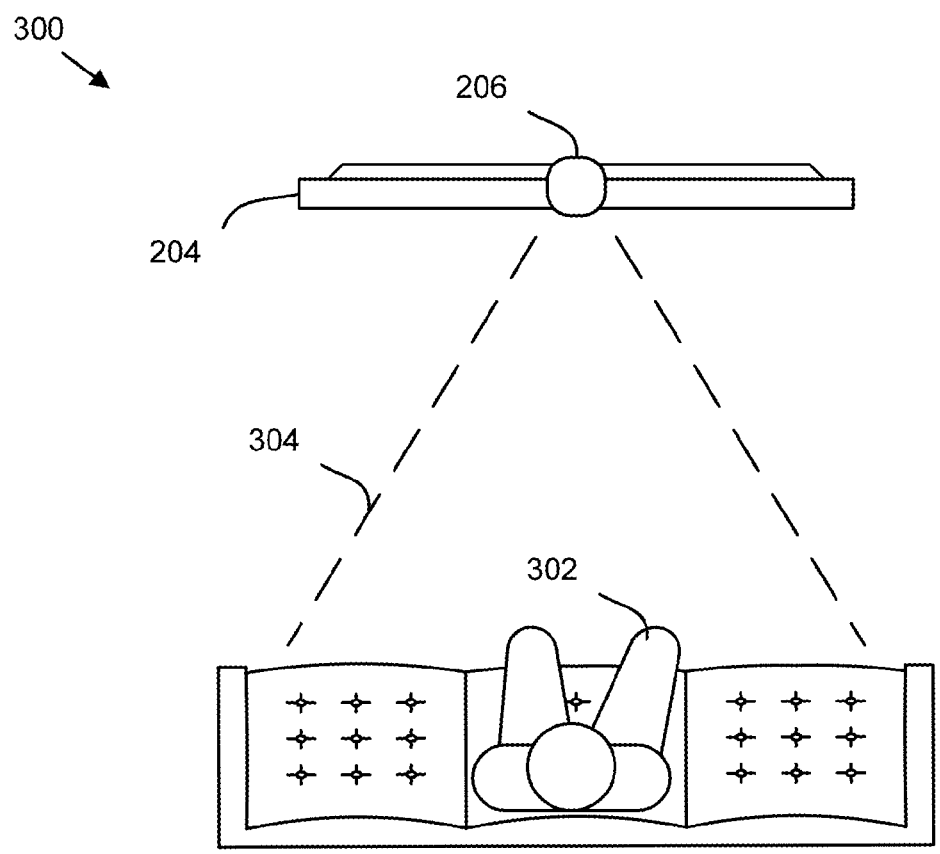
FIG. 3 is a plan view illustrating one embodiment of an observing area in accordance with the present invention.

The video capture module 206 may capture video of an observing area for the display 204. In one embodiment, the video capture module 206 may include a camera or other imaging device to capture video of an area in front of a display 204. The video capture module 206 may generate a video stream of the observing area. FIG. 3 illustrates a plan view of one embodiment of an observing area 300 of a display 204. A display 204 and an individual 302 observing the display 204 are shown. A video capture module 206 is shown on top of the display 204 that captures video of an area indicated by lines 304.

The video capture module 206 may capture one or both of visual and audio information. In one embodiment, the video capture module may only capture visual information such as a video feed. In another embodiment, the video capture module 206 may capture audio information such as by using a microphone or other sound capture device at the location of the media system 104.

In one embodiment, the video capture module 206 may be included in the body of a device that includes the display 204. In one embodiment, the body of the display 204 may include all components of a media system 104. For example, a smart TV or other display device with a video camera and/or processing capabilities may be used as at least a portion of a media system 104 in some embodiments. In other embodiments, a phone or similar portable device, such as a tablet, with a camera may be in communication with a television, monitor, or any other type of display to form a portion of a media system 104. For example, the image capture, processing, communication, or other capacities of a phone may be paired in a wired or wireless manner with one or more other devices, such as a display 204, to form a media system 104. Numerous other combinations of devices may be used to form a portion of a media system 104, as will be recognized by one skilled in the art in light of the present disclosure.

Returning to FIG. 2, the video encoding module 208 may encode the video feed generated by the video capture module 206. In one embodiment, the video feed may be encoded in a compressed format for communication to another device or system by the communication module 202. For example, an encoded video feed may be sent to a remote social content apparatus 102 over a network 106. The video may be encoded in any format known in the art.

Additional or alternate modules may also be included in some embodiments. For example, any of the modules or functionality described in relation to the social content apparatus 102 may be included in the media system 104, in some embodiments. Other modules may also be included such as a processing module for performing program instructions. For example, one or more modules may take the form of software code and a processing module may include a processor for execution of the instructions. A memory module may also be included in some embodiments for storing code, content, tracked information, account data for individuals who use the media system 104, or other data.

Figure 4:
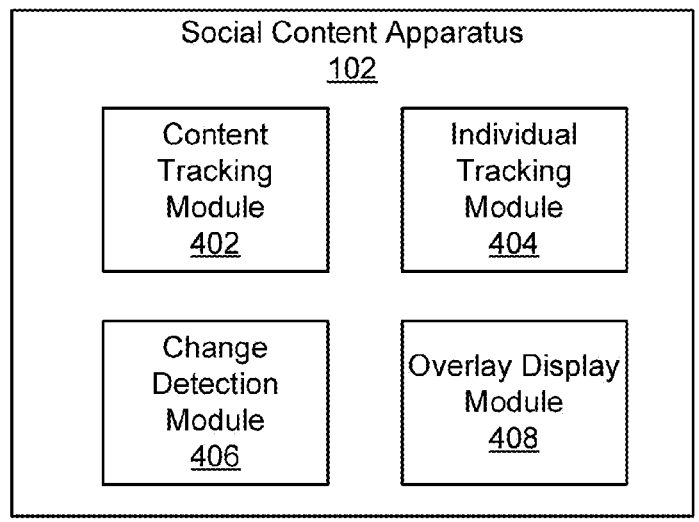
FIG. 4 is a schematic block diagram illustrating one embodiment of a social content apparatus in accordance with the present invention.

FIG. 4 is a schematic block diagram of one embodiment of a social content apparatus 102. The social content apparatus 102 may include a content tracking module 402, an individual tracking module 404, a change detection module 406, and an overlay display module 408. In one embodiment, the social content apparatus 102 controls when images of a specific contact are displayed.

The content tracking module 402 tracks content displayed at a plurality of locations. For example, the content tracking module 402 may track the content displayed on a display 204 of one or more of the media systems 104. For example, a media system 104 may send information to the social content apparatus 102 regarding the content that is being displayed. The information may include a title, serial number, or any other information that may be used to uniquely identify the content that is being displayed. The content tracking module 402 may also determine which media systems 104 are playing the same content. A table, database, file, or other data structure may be used to store information tracked or needed by the social content apparatus 102.

The individual tracking module 404 tracks one or more individuals within a video feed. For example, the individual tracking module 404 may locate an individual within a video feed and track their location. For example, if the individual 302 of FIG. 3 moves around the individual tracking module 404 may track the location of the individual 302 within a video feed generated by the video capture module 206. In one embodiment, the location of the individual corresponds to a pixel location within the images of the video feed. In one embodiment, the individual tracking module 404 receives a video feed and locates more than one individual within the video feed. The individual tracking module 404 may be configured to track the location of each individual within the individual feed. In one embodiment, the individual tracking module 404 may be configured to receive a plurality of video feeds of observing areas and may be able to track individuals within each video feed.

The change detection module 406 may detect a change with respect to one of the tracked individuals. In one embodiment, the change detection module 406 analyzes a video feed to detect a change in expression of the individual. For example, if the individual has a relaxed expression and then changes to a scared, smiling, or other expression, the change detection module 406 may detect the change. The change may be detected by analyzing a portion of a video feed where the individual is located. For example, the individual tracking module 404 may provide a location of an individual and the change detection module 406 may analyze the video feed in a corresponding location of the video feed to determine if there is a change in expression. In one embodiment, the change detection module 406 may detect a body movement of the individual. For example, if the user moves, performs a gesture, or adjusts a position the change detection module 406 may be able to detect the change.

In one embodiment, the change detection module 406 may be able to identify the type or classification of change. For example, the change detection module 406 may detect a change and classify it as a change in emotion, change in position, gesture, or any other type of change.

According to one embodiment, the processing of the video feed based on the individual tracking module 404 and/or the change detection module 406 may result in a high processing burden. According to one embodiment, these modules may be located remotely from a media system 104 to reduce the processing burden and/or reduce the processing requirements of the media system 104. In one embodiment, the individual tracking module 404 and/or the change detection module 406 may be located on a different device or system than the other modules 402, 408 and/or may be located within a datacenter or other system remote from a media system 104.

Figure 5:
FIG. 5 is a layout view illustrating one embodiment of a safe zone of content in accordance with the present invention.

The overlay display module 408 may initiate display of images of an individual at one location on a media system at another location. The overlay display module 408 may initiate the display of the images such that they overlay currently playing content. For example, if only a single display is available in a media system the images may be displayed such that they partially overlay the displayed content. In one embodiment, the overlaid images may be displayed within a safe zone of the content. For example, television networks, content producers, and others often create content with industry accepted safe zones where content may be overlaid without affecting or seriously affecting the viewing of the content. Such safe zones may be used for networks to provide additional material over the content such as an information ticker, a network symbol, or other content that was not included in the original content. FIG. 5 illustrates an exemplary safe zone 504 for the display of overlaid content. A display 204 is illustrated showing an image of a tree. A dotted line 502 indicates an inside boundary of safe zone 504 where overlaid content may be displayed without blocking important content or at least without seriously affecting viewing of the content. It is important to note that there is generally content within the safe zone 504 however it may be of less importance or focus than content outside of the save zone 504.

In one embodiment, the images may be displayed such that they do not overlay currently playing content. For example, if a media system 104 includes multiple displays, one or more of the displays may be utilized to display images of other individuals while one or more of the displays are used to show the content. In one embodiment, a projector may be used in conjunction with one or more displays to provide greater area for display of contacts and/or reduce distraction from the original content. For example, a display, such as a television, may project images onto an external surface behind or adjacent the display, such as a wall. In this manner, the viewing area of the display may be optimized while the images of individuals are projected onto the surface. In another embodiment, the projected images may be viewed at different sizes and/or resolutions. In one embodiment, the projector is movable such that the projector may be rotated and/or tilted to achieve a functional viewing angle and/or resolution. The position of the projector, in other embodiments, may be controlled using gestures detected using a gesture detection module 606, which is described below with reference to FIG. 6.

In other embodiments, the images of other individuals may be displayed in three dimensions ("3D"). In one embodiment, the display itself may incorporate 3D technology, such as a 3D television. The 3D effects, in other embodiments, may be accomplished using a two dimensional ("2D") camera and one or more mirrors. In certain embodiments, a user may need to wear eyeglasses to achieve the 3D effect. In further embodiments, the display may generate a 3D perspective without requiring eyewear. The display and/or projector, in yet another embodiment, can display 3D images of individuals around the user (away from the main display), which provides, from the user's prospective, the sensation that the individuals are in the same room as the user. The 3D images, in other embodiments, may be displayed on an external surface, such as being projected onto a wall, door, or the like. Moreover, in certain embodiments, a surround sound system may be used to enhance the sensation that other individuals are in the same room as the user.

Further, the images of other individuals may be displayed on a device capable of displaying augmented reality environments. Augmented reality, as used herein, is a live view of a real-world environment with elements that are augmented with computer-sensory input such as sound, video, graphics, or the like. There may be many devices capable of producing augmented reality environments, such as handheld devices, head-mounted displays, eyeglasses, contact lenses, virtual retinal displays, spatial augmented reality projectors, or the like. For example, a user may wear a pair of augmented reality eyeglasses while watching television with other individuals. The images of the other individuals may be displayed on the eyeglasses such that the user does not lose focus on the television while interacting with the other individuals.

In one embodiment, the initiation of images to be displayed may depend on information produced or determined by the other modules 402-406. For example, whether images of a specific individual are to be overlaid or displayed on a specific media system 104 may depend at least partially on the content displayed. For example, if two different media systems 104 are playing the same content, images of one individual at the location of the first media system 104 may be allowed to be displayed at the location of the second media system 104. Additionally, the individual tracking module 404 may control which portions of a video feed are used for images to be displayed at a remote media system 104. In one embodiment, for example, a portion of a video feed surrounding a tracked individual may be cut out from the rest of the video feed for display. Thus only the individual and a portion of the individual's environment may be displayed. Similarly, images may only be displayed of the individual for whom the change has been detected. For example, if an individual laughs or smiles, perhaps a portion of a video feed including that individual is extracted from the video feed for display as an overlay on a remote media system 104.

In one embodiment, the overlay display module initiates a display of images by identifying contacts, video feeds, or other information to identify to a media system 104 what should be displayed. For example, a media system 104 may include a constant feed of images or video corresponding to one or more individuals and only make them visible for display when instructed to do so by the overlay display module 408. In one embodiment, the overlay display module 408 may actually assemble video or images for display and send them and provide them to a media system 104. In one embodiment, the overlay display module 408 may create an overall content feed that includes the original content plus images overlaying the original content. In one embodiment, a media system may receive the content and the information regarding contacts to be displayed and create its own video feed with images overlaying the content.

Figure 6:
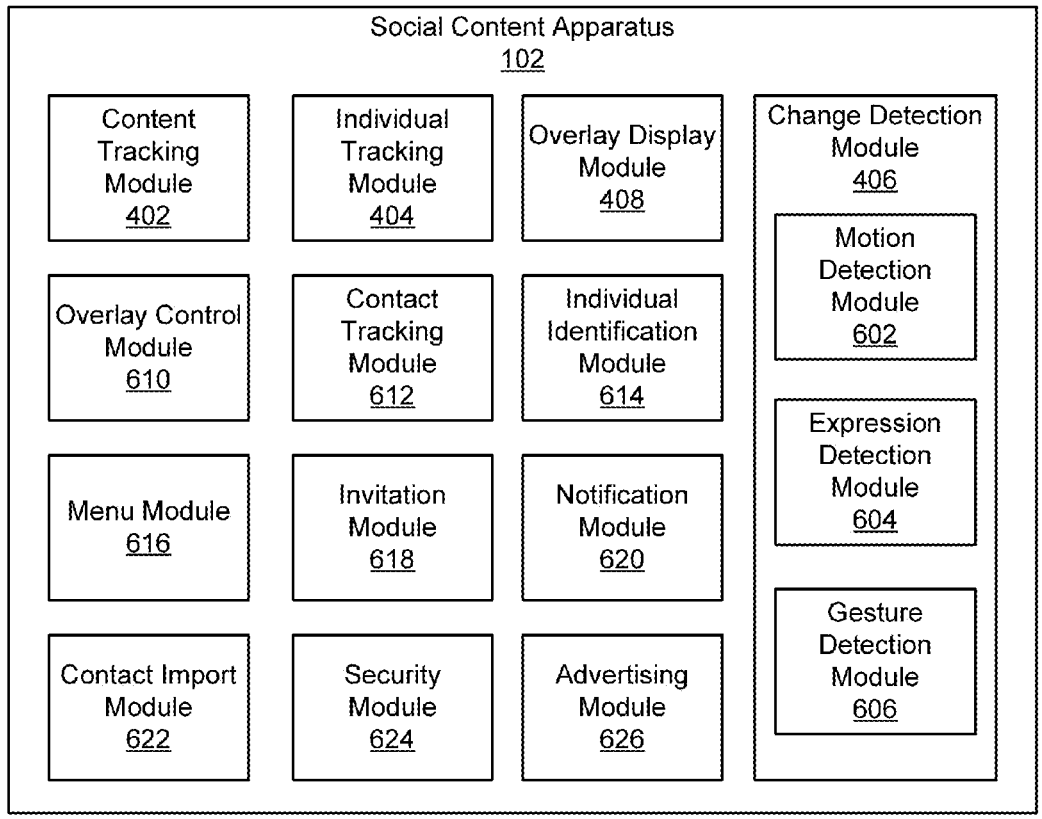
FIG. 6 is a schematic block diagram illustrating another embodiment of a social content apparatus in accordance with the present invention.

FIG. 6 illustrates another embodiment of a social content apparatus 102. The social content apparatus 102 includes the modules 402-408 of FIG. 4 but also includes additional exemplary modules 602-624 which may be included in some embodiments. Specifically, the change detection module 406 includes a motion detection module 602, an expression detection module 604, and a gesture detection module 606. The social content apparatus 102 further includes an overlay control module 610, a contact tracking module 612, an individual identification module 614, a menu module 616, an invitation module 618, a notification module 620, a contact import module 622, a security module 624, and an advertising module 626.

It is important to note that not all modules 402-408 and 602-626 may be included in all embodiments. In fact, any one or a combination of two or more of the modules 402-408 and 602-626 may be present in some embodiments, without limitation. It is further important to note that the modules 402-408 and 602-626 need not be located within the same device or system. For example, some modules may be located within a media system 104 while other modules may be located within a social content apparatus 102 located remotely over a network 106. Furthermore, the functionality provided by the modules may be distributed accurse a plurality of devices and systems to form a distributed processing environment. One of skill in the art will recognize in light of the present disclosure that such modifications are possible and may even be desirable in some circumstances.

For example, a very large processing burden may be required with modules 402-408 and 602-626 implemented as software. In such embodiments, it may be desirable to have at least some portions of the processing occur on different systems. For example, it may be desirable to have a highly specialized data center used to process data according to some modules rather than requiring users to purchase or own expensive computing or information processing equipment. Similarly, it may be desirable to distribute a processing burden across multiple devices or systems to more efficiently handle the processing requirements.

The change detection module 406 may include one or more modules to detect changes in a video feed or images of an individual captured in a video feed. The motion detection module 602 may be configured to detect motion of an individual. The motion detection module 602 may evaluate a portion of a video feed to detect a movement of a body or appendage of an individual. In one embodiment, the motion detection module 602 may assign a movement level of movement to the detected movement. For example, if an individual only barely moves a hand or appendage the motion detection module 602 may assign a movement level that indicates a small amount of movement while if an individual waves his or her arms, jumps up in his or her seat, or performs another large movement, the motion detection module 602 may assign a movement level that indicates a large amount of movement. Similarly, the motion detection module 602 may assign a movement level based on the frequency of movement. For example, if an individual moves repeatedly within a short time period the motion detection module 602 may assign a movement level that indicates a large amount of movement. In one embodiment, the movement level may be assigned to a video feed or to an individual within the feed.

In one embodiment, the detection of movement or an assignment of a movement level by the motion detection module 602 may affect the display of images of individuals. For example, the detection of movement or a higher movement level may trigger a display of the moving individual. In one embodiment, if the movement is too high for a certain period of time, the moving individual may be blocked from display. According to one embodiment, an individual may adjust settings on a media system 104 to control what level of movement is desired before display and/or what level of movement is excessive. For example, movement levels above the desired level and below the excessive level may result in a video feed of the individual being displayed on a contact's screen.

In one embodiment, the motion detection module 602 may be configured to detect movements where an individual is attempting to capture the attention of a friend or contact. For example, when the individual begins to talk, wave a hand, or perform another motion the individual may be displayed on the contacts media system 104. The contact may then be able to see, talk to, and/or otherwise respond to the display of the individual on the contact's media system 104.

The expression detection module 604 may be configured to detect an expression of an individual. For example, the expression detection module 604 may analyze a portion of a video feed corresponding to a face of an individual to determine an expression or emotion of the individual. In one embodiment, the expression detection module 604 may analyze the individual's face and/or body to determine an expression or emotional state of the individual. In one embodiment, expression detection module 604 may assign an expression state or emotional state to an individual based on the analysis. For example, a user may be assigned an angry, scared, excited, happy, laughing, sad, or any other emotional state or expression. In one embodiment, the expression detection module 604 may simply detect a change in expression or emotion without assigning a state.

In one embodiment, the change in expression or current expression of an individual may trigger display of that individual on a contact's media system 104. For example, if an individual is watching a movie and becomes scared, the expression detection module 604 may detect that the individual is scared and initiate display of that individual on the friend's media system 104.

The gesture detection module 606 may detect gestures performed by an individual within a video feed. The detection of gestures may allow for an individual to control a media system 104 and/or a social content apparatus 102 with their body and gestures. Additionally, the gesture detection module 606 may allow an individual to interact with other individuals on other media systems 104, talk shows, or other content. For example, gestures may be used to navigate menus, trigger display of other individuals, respond to content, or control any other aspect of a social content system 100. In one embodiment, hand and body gestures may be used as a mode of input for control of the media system 104 and/or the social content apparatus 102.

An exemplary gesture may include moving a hand to select and move items or contacts on screen. Another exemplary gesture may include turning one's head to the left or the right to select one or more contacts. For example, by turning one's head to the left an individual may select a contact that is located on the left side of a display 204 and carry on a conversation with them. In one embodiment, a variety of different gestures may be used to modify layouts and settings, and/or communicate with contacts or in content.

An overlay control module 610 may provide controls allowing an individual to adjust the display of individuals on a display 204. In one embodiment, the overlay control module 610 may allow an individual to adjust settings for which individuals are displayed, when they are displayed, how large they appear, and where they are displayed. For example, an individual may enter information corresponding to a contact and set custom settings for what motion level, the expressions, and/or gestures should trigger display of that individual. Similarly, the individual may be able to determine if a contact can see the individual and/or the individual's status. For example, the individual may be able to set whether someone can see if they are available or what they are watching, etc. The overlay control module 610 may allow an individual to specify a custom size, location, opacity, or other attribute for a specific contact.

The contact tracking module 612 may track the status of contacts for a specific individual. For example, the contact tracking module 612 may track whether a contact is watching content, what the content is, and/or other information. The contact tracking module 612 may help create lists of available contacts for an individual who is using a media system 104, such that a user may select one or more available contacts to interact with from the list of available contacts. The information tracked by the contact tracking module 612 may determine when a video feed of a contact is available for display on an individual's media system 104.

The individual identification module 614 may identify individuals within a video feed. According to one embodiment, a media system 104 may be located in a household where more than one person uses the media system 104. In such an embodiment, it may be undesirable to treat a media system 104 as if it displays media for only a single individual. The individual identification module 614 may use any type of individual identification techniques known in the art included facial, voice, body or any other identification technique to differentiate between individuals.

In one embodiment, the individual identification module 614 may identify one or more individuals within an observing area of a display 204 and then provide overlays corresponding to the identified individuals. For example, contacts of either individual may be displayed if their display is triggered. Similarly, an individual may be displayed to the individual's contacts if a change in expression is detected. In one embodiment, contacts of one individual may not be able to see images of another individual watching the same media system. For example, if a first and second individual are both watching content on a media system 104 only contacts of the first individual may be able to see images of the first individual and only contacts of the second individual may be able to see images of the second individual. In another embodiment, all individuals watching the same media system 104 may be available for display to any contact of any one of the individuals.

Figure 7:
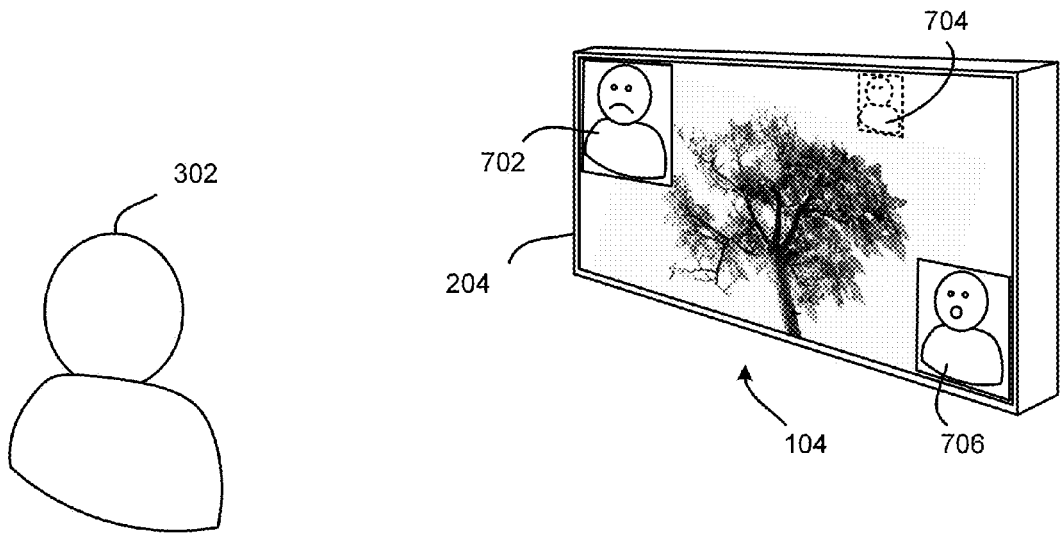
FIG. 7 is a perspective view illustrating one embodiment of the display of contacts overlaying content in accordance with the present invention.

FIG. 7 illustrates one embodiment of an individual who is watching content on a media system 104 within a social content system 100. A display 204 is depicted displaying content with video feeds of contacts 702-706 at least partially overlaying the content. According to one embodiment, the contacts 702-706 have information listed in an account of the individual 302 and are also watching the same content as the individual 302. Similarly, the individual 302 may have information listed in accounts of each of the contacts 702-706.

In the depicted embodiment, the contacts 702 and 706 are displayed in an opaque and larger area than the contact 704. According to one embodiment, the larger and opaque display of the contacts 702 and 706 may be due to their expressions reflecting sadness or fear regarding the current content being played. For example, at an intense part of a movie the expressions of the contacts 702 and 706 may have changed and been detected by the expression detection module 604. Because the contacts were watching the same content, based on the tracking of the content tracking module 402, were contacts of the individual 302, and were identified by the individual identification module 614 their images were displayed for viewing by the individual 302. According to one embodiment, the images of the contacts 702 and 706 were smaller and more transparent, similar to contact 704 but were enlarged and/or faded in, in response to their expression. According to one embodiment, after a period of time or a change in expression, the images of contacts 702 and 706 may shrink and return to a default size (for example the size of contact 704). According to one embodiment, a variety of transitions may be used to transition between a state of being displayed and being in the background or not displayed.

According to one embodiment, contacts 702-706 may be the only contacts of individual 302 that are currently available and watching the same content. According to another embodiment, other contacts are available but have been hidden or may have not had any detected changes within a threshold time. According to one embodiment, the individual may have arranged the location of the contacts 702-706 into the illustrate layout and may have configured the social content apparatus 102 to only show up to three contacts at a time.

In one embodiment, the individual 302 may interact with the contacts 702-706 using one or more gestures. For example, the individual 302 may select contact 702 by staring at his image 702 and/or turning his head to the left, and speaking. This may enlarge the individual 302 on the media system 104 of contact 702 without affecting displays of the other contacts 704-706. Similarly, the image of contact 702 may also be enlarged on the display 204. In one embodiment, audio captured at the location of the contact 702 may be played at the location of the individual 302 and audio captured at the location of individual 302 may be played at the location of contact 702. In one embodiment, audio from the contact 702 may be played on a dedicated speaker or on a speaker corresponding to the location of the contact 702 on the display such that audio from media content is not disrupted. Then, the individual and the contact 702 may be able to carry on a conversation. Although contacts 704-706 may able to tell that the individual 302 and contact 702 are carrying on a conversation it may not affect how they are displayed and may be largely ignored, such as if two persons in the same room carry on a conversation with each other without including the rest of the group. In one embodiment, gestures may also be used to move the contacts 702-706 around the display 204 and/or to adjust their size, opacity, or other characteristics of the images.

Returning to FIG. 6 the social content apparatus 102 may include a menu module 616. The menu module 616 may provide a menu allowing an individual to select content based on what a contact is watching. In one embodiment, the menu module 616 provides a menu allowing an individual to alternatively select content based on content selection or selection of a contact.

Figure 8:
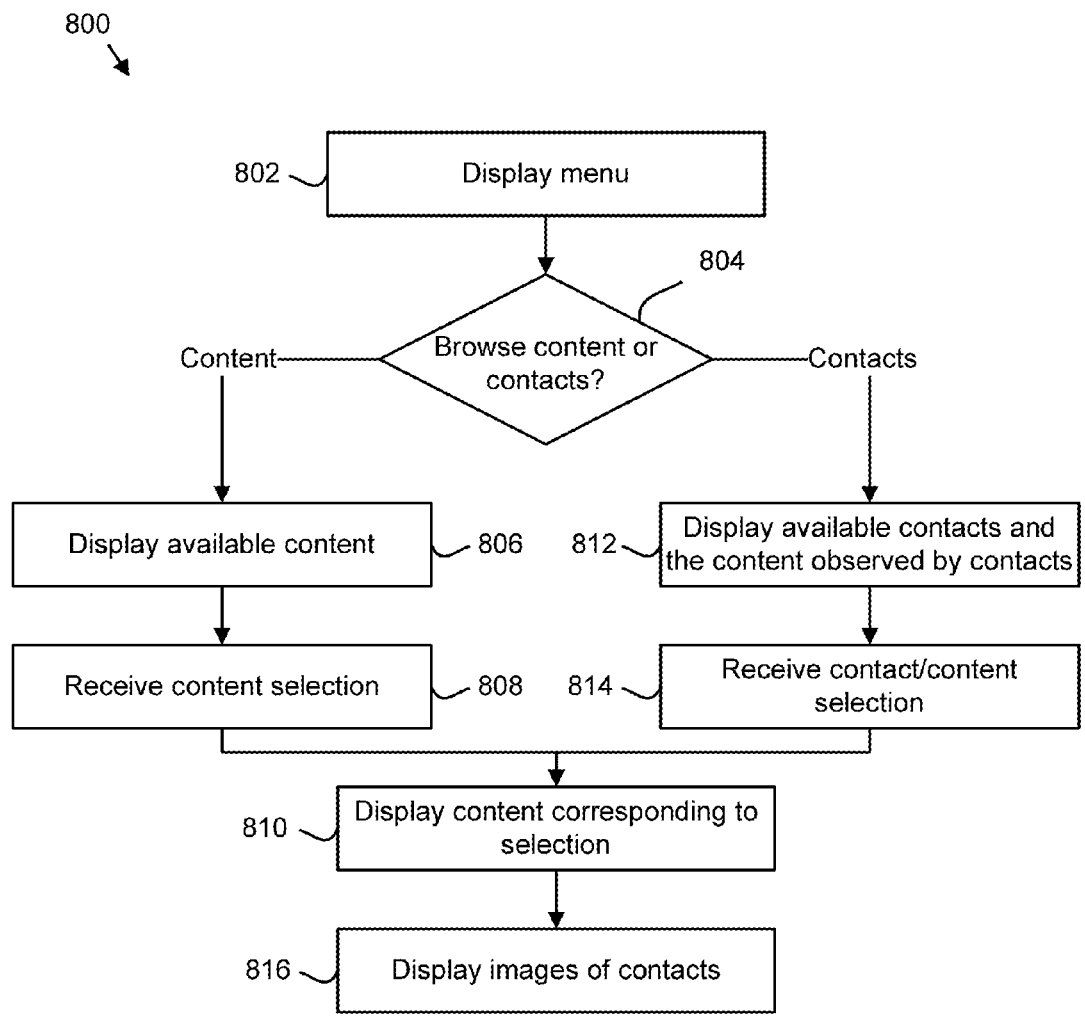
FIG. 8 is a schematic flow chart diagram illustrating one embodiment of a method for providing a menu in accordance with the present invention.

FIG. 8 illustrates one embodiment a method 800 performed by a social content apparatus 102. In one embodiment, steps 802-814 are performed by a menu module 616.

The menu module 616 displays 802 a menu. The menu module 616 may display 802 the menu on a display 204 on a media system 104 or any other device. The menu module 616 may display 802 a variety of options for selection and may allow an individual to select one of the options. For example, the menu module 616 may display 802 an option to browse content and/or an option to browse contacts.

The menu module 616 may determine 804 whether a user has selected to browse content or browse contacts. If the user has provided input indicating selection of browsing content, the menu module 616 displays 806 available content. The menu module 616 may allow a user to browse the available content and select specific content for display. The menu module 616 may provide a menu that includes lists, icons, images, words, or other information to allow an individual to view and decide what content to view. The menu module 616 may receive 808 a content selection and then display 810 content corresponding to the selection.

If the menu module determines 804 that a user has provided input selecting to browse contacts, the menu module 616 displays 812 available contacts. The user may browse and view contacts. The menu module 616 may further display 812 the content currently being observed by a displayed contact. The user may browse the available contacts to view what content the contacts are watching and may provide input regarding which contact the user wants to join and/or what content the user wants to view. The menu module 616 may receive 814 a contact/content selection and then display 810 content corresponding to the selection. For example, content corresponding to the selected contact may be displayed and may include the content that is currently being watched by the contact. While content corresponding to the selection is displayed 810 images of contacts may also be displayed 816 according to the principles and embodiments provided herein.

Returning to FIG. 6 an invitation module 618 may allow an individual to invite one or more contacts to watch content with the individual. According to one embodiment, an individual may select an option through gestures or an input device to invite one or more contacts. The one or more contacts may be able to receive the invite and join the individual in watching the content. In one embodiment, the invite may be sent via email, text message, or any other notification. In one embodiment, the invite may be posted on a social networking site such as a site provided by a social network provider 110. For example, a user may post invites to "friends" on Facebook®, LinkedIn®, Google Plus®, or any other social network.

In one embodiment, a user may respond to an invite by turning on a media system 104 and going to a corresponding channel or selecting content from a content provider 108. In one embodiment, a link may be provided which the user may be able to select to tune a media system 104 to the corresponding content. In one embodiment, contacts may only be able to respond to invites if they have access to the content. For example, if two individuals want to watch a television show together they may each be required to have access to that content on their respective media systems 104 or through their respective accounts.

In another embodiment, an individual may be able to share access to certain content with a contact. The individual may be able to invite a contact to watch a movie through a provider to which the contact normally doesn't have access. In one embodiment, the individual may purchase access for the friend for that session. For example, an individual may have already purchased access to content provided by a content provider on a subscription basis. The individual may be allowed to purchase a ticket to allow one time viewing for a third party, which can be sent to a friend. For example, a link in an email, chat message, social network message, media system 104 notification, or other message may be sent to the friend. The friend may then open the link and be granted access to the purchased content for viewing with the individual.

In one embodiment, content located locally to one media system 104 may be streamed to or shared with another media system. Similar to the content sharing described above, local content, such as a DVD, home video, or other content may be streamed to a contact at another media system 104 location. If the local content is copyrighted or copyright protected, for example using digital rights management (DRM) or other copy protection methods or software, a user may be able to purchase a pass to share the content with a contact. For example, the user may be able to purchase a ticket through a media system 104, website, or other location and initiate content sharing with a contact. The individual and contact may be able to watch the content together even though only one of them has a corresponding DVD, etc.

In one embodiment, content observed by contacts may be synchronized. This may allow two individuals to be watching a show or movie at substantially the same time. This may allow the individuals to share the experience much better than if they watched the content at different times. For example, triggering the display of images of contacts based on their expressions and movements while watching content at the same time may be more enjoyable, and make more sense, than if these were captured without knowledge or understanding of what triggered the response. By watching and seeing reactions of friends in real time, the experience of watching a movie together in person is more closely matched. For example, if an individual invites a contact to watch a movie with the individual, a social content apparatus 102 may synchronize the display of the content on the media systems 104 such that the display at different media systems 104 is substantially the same. Individuals may come away from the viewing feeling that they had truly watched and experienced the content together.

The social content apparatus 102 may include a notification module 620 that displays notifications for an individual. For example, invitations, messages from contacts, or other information may be displayed on a display 204 to notify an individual of such communication.

The contact import module 622 may import contacts from an account of an individual. The contact import module 622 may be configured to import contacts from any email, social networking, or any other type of account that maintains contacts. For example, a user may not be required to reenter information for friends, family, or acquaintances because the individual may be able to have the information automatically imported from an account where this information may already be stored. In one embodiment, the contact import module 622 may receive login details or other information from the individual and then may access the social network account, email account, or other account to import contact data.

The security module 624 may limit access to data or video feeds. For example, the security module 624 may manage permissions that allow others to see a video feed. For example, each individual that accesses a media system 104 or social content apparatus 102 may be required to have an account. According to one embodiment, the security module 624 may grant or limit access to video feeds, status information, or other information about an individual based on the account used. For example, accounts listed in a contact list may be allowed access to view the availability of an individual or the content observed by an individual while other accounts may be blocked. Additionally, the security module may encrypt sensitive data, video feeds, or other information that may be undesirable for display to the public.

In one embodiment, an individual may be able to set up an account to control one or more settings for usage of a media system 104, social content apparatus 102, and/or social content system 100. In one embodiment, each account may include customizable settings for storing information for contacts, privacy settings, content settings, or a variety of other settings. In one embodiment, each account may include a number of privacy levels which may be set by an individual depending on the individual's desires. For example, a individual may desire to watch a movie or TV show in their pajamas without being worried that others will be able to see them. Similarly, the individual may only want family or other close friends to be able to participate in a shared watching of a particular movie or other content. In one embodiment, an individual may be able to set a privacy level that meets the individual's desires at a specific time. In one embodiment, the security module 624 may allow or disallow others from viewing a status, a video feed, or information in an account based privacy settings within an individual's account.

The advertising module 626 may detect one or more actions of individuals in response to advertisements. For example, the advertising module 626 may detect whether individuals leave a room or stay and watch a commercial. By tracking behavior of an individual in response to a commercial, the advertising module 626 may be able to obtain data that allows an advertising agency to create more pleasing advertisements. For example, if it is determined from data obtained by the advertising module 626 that a specific individual enjoys and generally watches commercials with mountain scenery, advertisements with such scenery may be selected for display over other advertisements. Alternatively, different versions of advertisements for the same product may be provided and selected between based on the preferences or past behavior of a specific individual.

Figure 9:
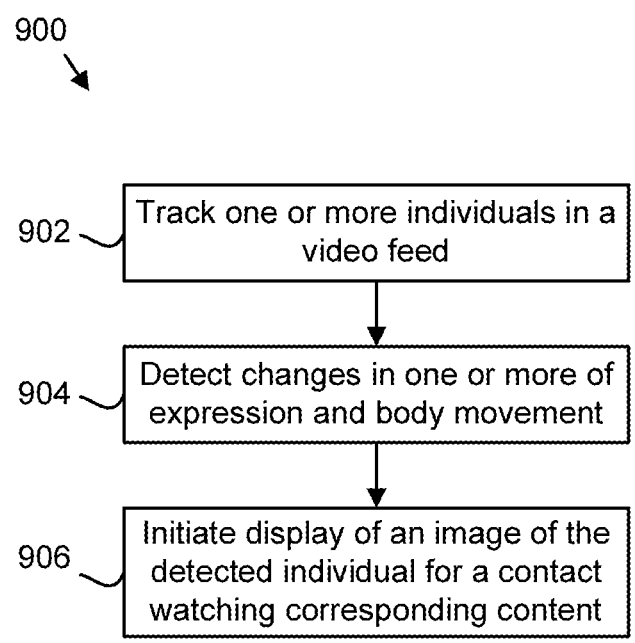
FIG. 9 is a schematic flow chart diagram illustrating one embodiment of a method for providing social content in accordance with the present invention.

FIG. 9 is one embodiment of a method 900 for providing social content. The method 900 may be performed by a social content apparatus 102 or social content system 100 as described above.

An individual tracking module 404 tracks 902 one or more individuals in a video feed. The video feed may be of an observing area of a display 204 where content is being displayed. The video feed may be received from a video capture module 206 of a media system 104. More than one video feed from different media systems 104 may be received and one or more individuals in each video feed may be tracked. In one embodiment, the individuals are tracked 902 by analyzing images in the video feed to locate an individual. For example, the individual tracking module 404 may utilize image object recognition to locate a head or body part of an individual. The individual tracking module 404 may track the location of the individual within the video and may adjust for movement or changes of location of the individual within the video feed.

A change detection module 406 may detect 904 changes of a tracked individual. The change detection module 406 may detect 904 changes in one or more of expression and body movement of the individual. For example, an expression detection module 604 may detect 904 an expression reflecting an emotional state of the individual such as a smile, frown, scowl, or other expression. The change detection module 406 may also detect 904 a movement of the individual or a gesture performed by the individual.

An overlay display module 408 may initiate display 906 of an image of the detected individual to a contact who is watching corresponding content on a different media system 104. For example, if the individual has been surprised by content the individual is watching the change detection module 406 may detect a surprised expression and video of the individual may be sent to the media system 104 of a contact of display. The contact may be able to see the reaction of the individual.

To illustrate exemplary usage of a social content apparatus 102 and a social content system 100 a number of exemplary scenarios are provided below.

First Exemplary Scenario

According to a first exemplary scenario a grandparent wishes to see grandchildren that are located at a remote location. The grandparent calls a parent of the grandchildren and requests to watch a cartoon with them. The parent and the grandparent turn on their respective media systems 104 and tune to the same cartoon content. As the children watch the cartoon the change detection module 402 detects the expressions, movements, and excitement of the children and then displays images of these children on the grandparent's screen. The grandchildren may periodically see their grandparent smiling or laughing and may be able to talk while the cartoon is playing.

Second Exemplary Scenario

A national military provides a media system 104 for a group of soldiers to watch a movie. Spouses located elsewhere may watch the movie with their soldier by tuning into the same movie using a media system 104 at home. The media systems 104 and social content apparatus 102 cause the display of a video of the spouses soldier in response to that soldier reacting to the movie. The overlay display module 408 may only initiate display of images of a soldier for the spouse of the soldier. The soldiers are able to see their respective spouses in the same manner.

Third Exemplary Scenario

A number of friends play a first person shooter video game together. Each friend is located at their own home with their own media system 104. As the friends play the game, the reactions or expressions of a friend are displayed in a video overlay on another friend's display 204. For example, if a first friend successfully eliminates a second friend in the game, a video of the second friend's reaction may be displayed as an overlay on the first friend's display.

Fourth Exemplary Scenario

While talking on the phone a number of friends decide to watch a particular movie that is available through an online subscription based movie streaming service. All of the friends but one have subscriptions to the service. One of the friends purchases a ticket which is then sent to the media system 104 of the friend without the subscription. The friend who purchased the ticket also sends invitations using the invitation module 618 to the other friends that already have subscriptions to the service. As each friend receives the invitations they select a link which brings them to a screen awaiting the beginning of the movie. As soon as all friends have selected the link and are at the waiting screen the playing of the movie may be initiated at substantially the same time at each friend's location. The friends are able to enjoy each other's reactions, conversation, and the feeling of experiencing the movie together in real time.

Fifth Exemplary Scenario

A pastor provides a church service as a television show. Individuals may tune into the show using their media systems 104. The pastor may pray together with the participants and present a sermon. The pastor asks if any participants have any questions or comments on the sermon. Individuals at home may raise their hands in front of their media systems 104 to be placed in a queue to ask questions. A gesture detection module 606 may detect the hand raising gesture and place the corresponding individual in the queue. The pastor may select from those in the queue to receive a video feed of a specific individual so that they can comment or ask a question. The video feed of that individual may also be provided as an overlay on the screens of other participants. The gesture detection module 606 may also detect other positions such as an individual bowing their head and putting their hands together in prayer. The pastor may be able to wait until his participants are ready for the prayer before beginning a prayer.

As the service proceeds, the reactions or actions of others participating in front of their own media systems 104 may be shown on other media systems. Those watching, such as those that lack the strength to leave their homes to attend church meetings in person, may feel that they are participating in the service together with others and may have a sense of community. At the end of the service the pastor may ask for those who need prayers on their behalf to raise their hands. An individual may raise a hand to have the individual's name and/or contact information sent to the pastor. The pastor may be able to pray for these individuals and/or ask others in the congregation to pray for these individuals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a content tracking module configured to track content displayed at a plurality of locations, the content being displayed on an electronic display;
    an individual tracking module configured to track one or more individuals in a plurality of video feeds of observing areas at the plurality of locations, the plurality of video feeds comprising a first video feed and a second video feed;
    a change detection module configured to detect one or more of a change in expression and body movement in at least one of the one or more individuals in the first video feed; and
    an overlay display module configured to initiate display of an image of the at least one individuals overlaying the content displayed at a location of the second video feed, wherein one or more of a size and an opacity of an image of an individual changes in response to detecting one of the change in expression and body movement of the individual, the image returning to one or more of a default size and a default opacity after a period of time.

2. The apparatus of claim 1, wherein the change detection module further comprises:
    a motion detection module configured to detect motion of an individual, the motion being detected by evaluating at least a portion of a video feed, the detected motion being assigned a movement level;
    an expression detection module configured to detect an expression of an individual, the expression being detected by evaluating at least a portion of a video feed corresponding to a face of an individual, an emotional state being assigned to the individual in response to the expression being detected; and a gesture detection module configured to detect gestures performed by an individual, the gestures being detected by evaluating at least a portion of a video feed, wherein one or more interactive features may be controlled in response to one or more gestures being detected.

3. The apparatus of claim 1, further comprising an overlay control module configured to adjust the display of one or more individuals on the electronic display in response to a user adjusting one or more display settings associated with a displayed image of an individual.

4. The apparatus of claim 1, further comprising a contact tracking module configured to track the status of one or more contacts associated with a user wherein a list of available contacts is displayed on the electronic display such that a user may select one or more available contacts to interact with from the list of available contacts.

5. The apparatus of claim 1, further comprising an individual identification module configured to identify one or more individuals within a video feed using one or more identification techniques wherein one or more overlays associated with the one or more individuals are displayed on the electronic display.

6. The apparatus of claim 1, further comprising a menu module configured to present a list of one or more of available content and available contacts, the available content associated with one or more available contacts, the one or more contacts currently viewing the associated available content, the user selecting one of an available content and an available contact.

7. The apparatus of claim 1, further comprising an invitation module configured to invite one or more contacts associated with a user to view content with the user, an invite being sent to one or more contacts using one or more of an electronic message system and a social network platform.

8. The apparatus of claim 1, further comprising a contact import module configured to import one or more contacts associated with a user, the one or more contacts being imported from one or more of an email account and a social network account associated with the user.

9. The apparatus of claim 1, further comprising a security module configured to limit access to one or more data and video feeds, the security module assigning access permissions to one or more data and video feeds wherein a user is granted access in response to having an associated account with the correct permissions.

10. The apparatus of claim 1, further comprising an advertising module configured to detect one or more actions of individuals in response to being presented with an advertisement.

11. The apparatus of claim 1, wherein the overlay display module displays an image of the at least one individuals in three dimensions ("3D"), the 3D image being displayed on an external surface.

12. A method comprising:
tracking content displayed at a plurality of locations, the content being displayed on an electronic display;
tracking one or more individuals in a plurality of video feeds of observing areas at the plurality of locations, the plurality of video feeds comprising a first video feed and a second video feed;
detecting one or more of a change in expression and body movement in at least one of the one or more individuals in the first video feed; and
initiating display of an image of the at least one individuals overlaying the content displayed at a location of the second video feed, wherein one or more of a size and an opacity of an image of an individual changes in response to detecting one of the change in expression and body movement of the individual, the image returning to one or more of a default size and a default opacity after a period of time.

13. The method of claim 12, further comprising adjusting the display of one or more individuals on the electronic display in response to a user adjusting one or more display settings associated with a displayed image of an individual.

14. The method of claim 12, further comprising tracking the status of one or more contacts associated with a user wherein a list of available contacts is displayed on the electronic display such that a user may select one or more available contacts to interact with from the list of available contacts.

15. The method of claim 12, further comprising identifying one or more individuals within a video feed using one or more identification techniques wherein one or more overlays associated with the one or more individuals are displayed on the electronic display.

16. The method of claim 12, further comprising presenting a list of one or more of available content and available contacts, the available content associated with one or more available contacts, the one or more contacts currently viewing the associated available content, the user selecting one of an available content and an available contact.

17. A system comprising:
a content provider;
a social network provider; and
a social content apparatus comprising:
    a content tracking module that tracks content displayed at a plurality of locations, the content provided by the content provider and displayed on an electronic display;
    an individual tracking module configured to track one or more individuals in a plurality of video feeds of observing areas at the plurality of locations, the plurality of video feeds comprising a first video feed and a second video feed;
    a change detection module configured to detect one or more of a change in expression and body movement in at least one of the one or more individuals in the first video feed; and
    an overlay display module configured to initiate display of an image of the at least one individuals overlaying the content displayed at a location of the second video feed, wherein one or more of a size and an opacity of an image of an individual changes in response to detecting one of the change in expression and body movement of the individual, the image returning to one or more of a default size and a default opacity after a period of time;
wherein the content provider, the social network provider, and the social content apparatus communicate over a network.

18. The system of claim 17, further comprising a video capture module configured to capture a video feed of an observing area of the display screen, the video feed comprising visual and audio information, the video capture module being disposed in a body of a display device.

19. The system of claim 17, further comprising a video encoding module configured to encode a video feed generated by a video capture module, the video feed being encoded in a compressed format.

20. The system of claim 17, further comprising a projector configured to project images onto an external surface, the projector being one or more of rotatable and tiltable.

* * * * *